US007355734B2

(12) United States Patent
Saito

(10) Patent No.: US 7,355,734 B2
(45) Date of Patent: Apr. 8, 2008

(54) DIAL-UP INTERNET FACSIMILE APPARATUS

(75) Inventor: Kyoji Saito, Kanagawa (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 753 days.

(21) Appl. No.: 09/994,014

(22) Filed: Nov. 27, 2001

(65) Prior Publication Data

US 2002/0085240 A1 Jul. 4, 2002

(30) Foreign Application Priority Data

Dec. 28, 2000 (JP) ............................. 2000-402565

(51) Int. Cl.
*G06K 1/00* (2006.01)
*H04M 1/64* (2006.01)
*H04M 11/00* (2006.01)
*H04N 1/00* (2006.01)

(52) U.S. Cl. ................ 358/1.15; 358/404; 379/88.11; 379/88.12; 379/88.22

(58) Field of Classification Search ............... 358/1.15, 358/402; 379/100.08, 88.12, 88.22; 715/748; 709/206
See application file for complete search history.

(56) References Cited

U.S. PATENT DOCUMENTS

| 5,757,891 | A | * | 5/1998 | Wang ....................... 379/93.24 |
| 5,933,478 | A | * | 8/1999 | Ozaki et al. ............... 379/93.24 |
| 6,094,277 | A | * | 7/2000 | Toyoda ...................... 358/1.15 |
| 6,128,101 | A | * | 10/2000 | Saito .......................... 358/402 |
| 6,219,150 | B1 | | 4/2001 | Eguchi |
| 6,323,962 | B1 | * | 11/2001 | Itoh et al. ................... 358/468 |
| 6,542,254 | B1 | * | 4/2003 | Fujiki ........................ 358/1.15 |
| 6,545,768 | B1 | * | 4/2003 | Matsubara et al. ......... 358/1.15 |
| 6,564,248 | B1 | * | 5/2003 | Budge et al. ............... 709/206 |
| 6,754,181 | B1 | * | 6/2004 | Elliott et al. ................ 370/252 |
| 6,898,627 | B1 | * | 5/2005 | Sekiguchi ................... 709/217 |

FOREIGN PATENT DOCUMENTS

| JP | 8-293979 | 11/1996 |
| JP | 11-069031 | 3/1999 |
| JP | 11-328060 | 11/1999 |
| JP | 2000-278475 | 10/2000 |

OTHER PUBLICATIONS

English Language Abstract of JP 11-069031.
English Language Abstract and English Language Translation of Relevant Portion of JP 8-293979.
English Language Abstract and English Language Translation of Relevant Portion of JP 2000-278475.
English Language Abstract of JP 11-328060.

* cited by examiner

*Primary Examiner*—Douglas Q. Tran
*Assistant Examiner*—Thomas J. Lett
(74) *Attorney, Agent, or Firm*—Greenblum & Bernstein, P.L.C.

(57) ABSTRACT

A dial-up internet facsimile apparatus comprises a modem that makes dial-up connection to a service provider of e-mail via telephone line, an operation section that has a stop button, and an e-mail reception section that receives e-mail data from the connected service provider. When the stop button is pressed while receiving the email data, the e-mail reception section disconnects the connection to the service provider without waiting for the completion of the reception of the e-mail data. This procedure prevents unnecessary telephone charges.

16 Claims, 8 Drawing Sheets

DIAL-UP INTERNET FACSIMILE APPARATUS

BACKGROUND OF THE INVENTION

1. Field of the Invention

The present invention relates to a dial-up internet facsimile apparatus that receives e-mails connecting to a service provider on the internet using dial-up connection via telephone line.

2. Description of Related Art

Presently, a so-called internet facsimile apparatus, as a facsimile apparatus for professional use, is becoming popular. An internet facsimile apparatus has a transmission function for transmitting an e-mail to a destination by converting scanned original data into an e-mail format, and a reception function for receiving an e-mail of the original data transmitted from the sender via internet. POP (Post Office Protocol) method is known as a reception function of internet facsimile apparatus. This method enables internet facsimile apparatus to access the receiving mailbox and to retrieve e-mails in the mailbox.

On the other hand, there is a market for facsimile apparatus for private use in addition to the one for professional use. In this market, functions and memory capacities of the facsimile apparatus are strictly limited because of the demand for downsizing and lowering the cost of facsimile apparatus, compared to the ones for professional use.

Recently, the internet facsimile apparatus for personal use has been progressing. Especially in the case of the internet facsimile apparatus for personal use, it is difficult to achieve a communication environment in which facsimile apparatus is connected to LAN and e-mails are transmitted and received via a personal mail server. Therefore, it is desirable to use a dial-up connection for connecting to a provider and to receive e-mails using the POP method.

However, the internet facsimile apparatus for personal use often cannot receive mail data of large size, when using the memory reception, because of the small memory capacity. More specifically, when message data is stored in the memory of the facsimile apparatus, there is a possibility of a memory overflow during the process of retrieving received messages from the mail server of the provider using the POP. When the memory overflows, the receiver can only receive partial message data. Using the POP method, the message remains in the server without being erased unless the message is completely retrieved and the receiving process is finished. Therefore, repeated trials of receiving the message by accessing the provider would still result in repeated memory overflows, and repeating the same process frequently causes unnecessary telephone charges when using public telephone network system.

SUMMARY OF THE INVENTION

The present invention is designed with respect to the above-described problems. The object of the present invention is to provide a dial-up internet facsimile apparatus that can prevent increasing telephone charges caused by repeated transaction to retrieve an e-mail of large size arrived at the e-mail server of the provider.

In the present invention, the facsimile apparatus disconnects the phone line or proceeds to receive the next message without waiting for a completion of the message reception, when a stop button is pressed during a message reception process of an e-mail. This procedure prevents unnecessary telephone charges.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

First Embodiment

Figure 1:
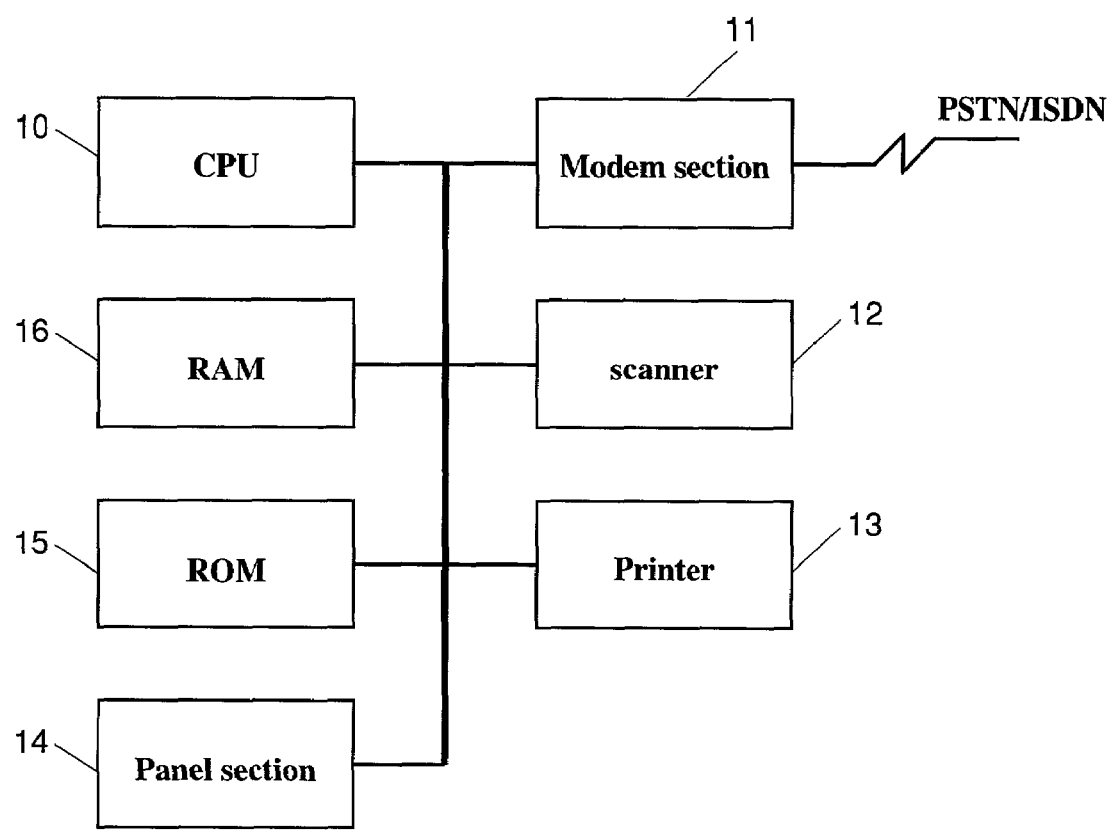
FIG. 1 shows hardware configuration of the internet facsimile apparatus of the first embodiment of the present invention.

FIG. 1 is a block diagram showing the hardware configuration of the internet facsimile apparatus of the first embodiment. The internet facsimile apparatus shown in the figure comprises a CPU 10, a modem section 11 that controls communication with the outside via analogue line or via ISDN, a scanner 12 that scans documents to be transmitted, a printer 13 that prints received data or scanned documents, a panel section 14 on which a user executes various operations including shutting down an operation described later, ROM 15 that stores programs for achieving functions of G3 and internet facsimile apparatus, and RAM 16 that provides a memory area of received data and a work area.

Figure 2:
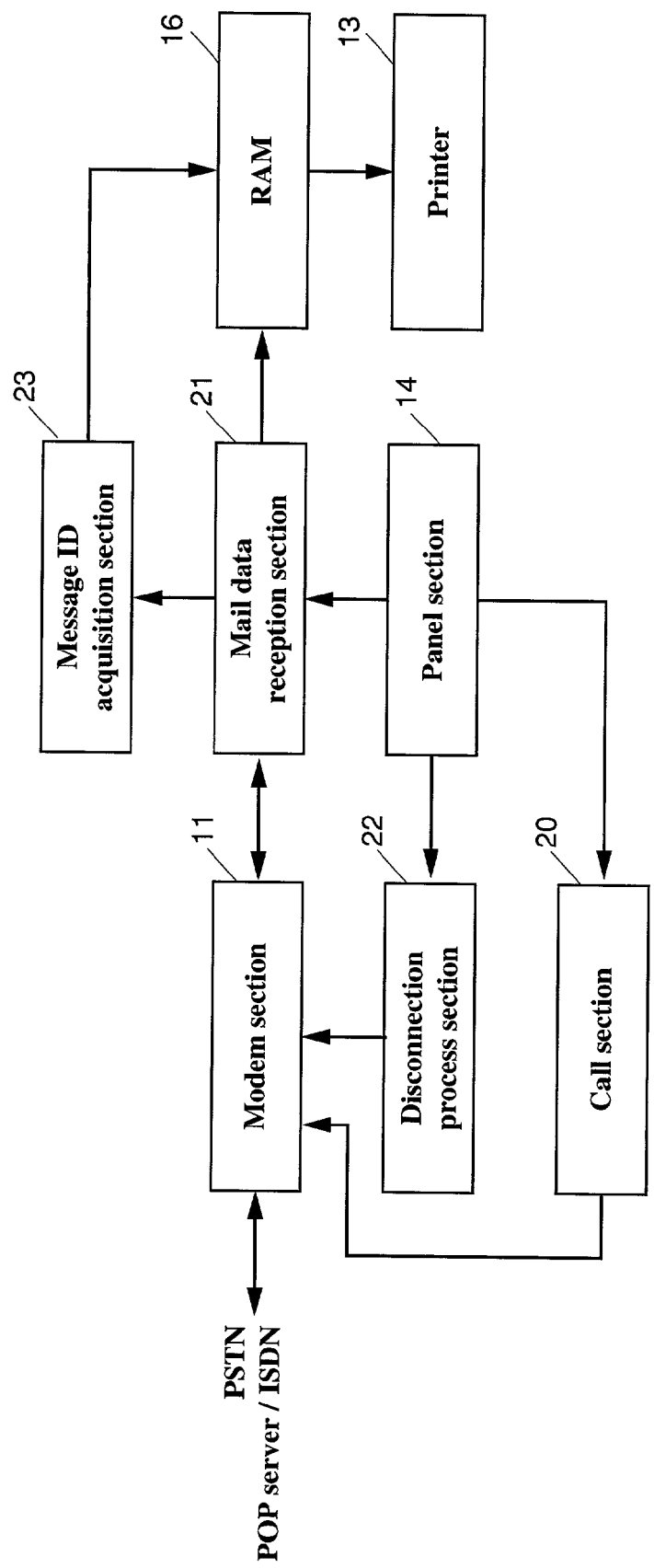
FIG. 2 is a functional block diagram of the reception function of the internet facsimile apparatus of the first embodiment.

FIG. 2 is a functional diagram mainly describing a reception function of the internet facsimile operation. When accessing a mail server of a provider, a call section 20, which is instructed of a telephone number from the panel section 14, makes a call via modem section 11 to a public telephone network. A mail data reception section 21 is a functional section that executes the e-mail reception process from the mail server of the provider connected to the network using the POP method. Also, when an instruction to disconnect is inputted from the panel section 14, during the e-mail reception using the POP method, a disconnection process section 22 forces the modem section 11 to disconnect the line without waiting for the termination process of the POP. When disconnection is forced without waiting for the termination process of the POP, a message ID acquisition section 23 acquires the message ID of the interrupted e-mail and save it to a predetermined address of RAM 16.

Figure 3:
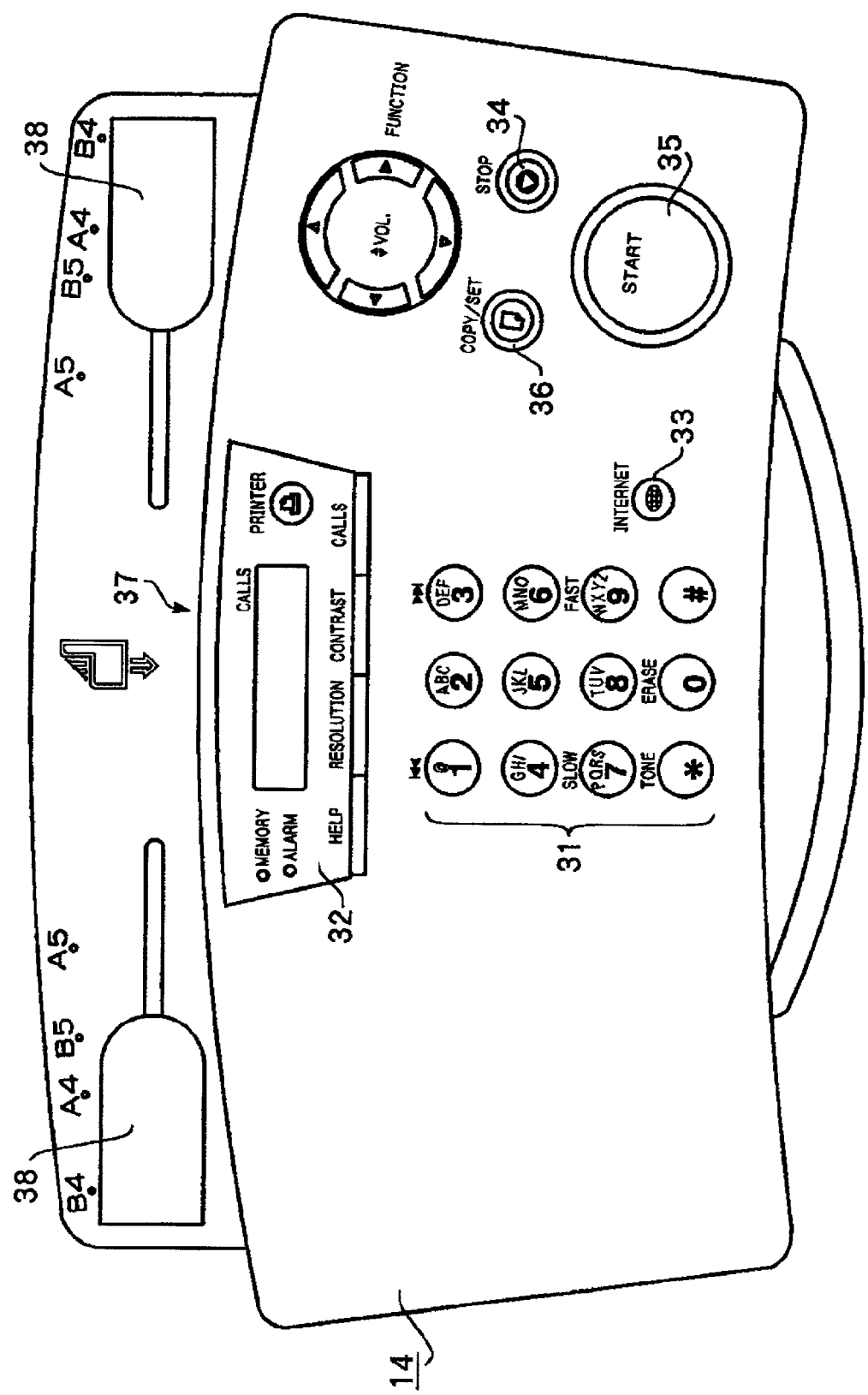
FIG. 3 is an outside drawing of the internet facsimile apparatus of the first embodiment.

Here, an external view of the internet facsimile apparatus of the present embodiment is described. FIG. 3 is an outside view of the present internet facsimile apparatus. The example shown in the figure is structured compactly for personal use. The panel section 14 is located at the upper surface of the facsimile apparatus. A numeric keypad 31 for inputting numbers and alphabets is located at the center of the panel section 14 and a display 32 is located above the numeric keypad 31.

An internet button 33 is located adjacent to the numeric keypad 31. The internet button 33 is one of the function keys that enables the apparatus to work as an internet facsimile apparatus. And a stop button 34 is also installed so that a user can request to disconnect the line during e-mail reception. Further, a start button 35 for a user to instruct a start of various processes, and a copy button 36 that enables the equipment to work as a copier, are installed.

A document insertion slot 37 is formed at the backside of the panel section on the upper surface of the facsimile apparatus and paper width control parts 38 are located at both sides of the document insertion slot 37, which slides according to the width of the document. At the document insertion slot 37, a document sensor (not shown in the figure) is equipped to detect an insertion of a document.

Next, operation of the internet facsimile apparatus of the present embodiment is described. Hereafter, operation for the e-mail reception is mainly described.

Figure 4:
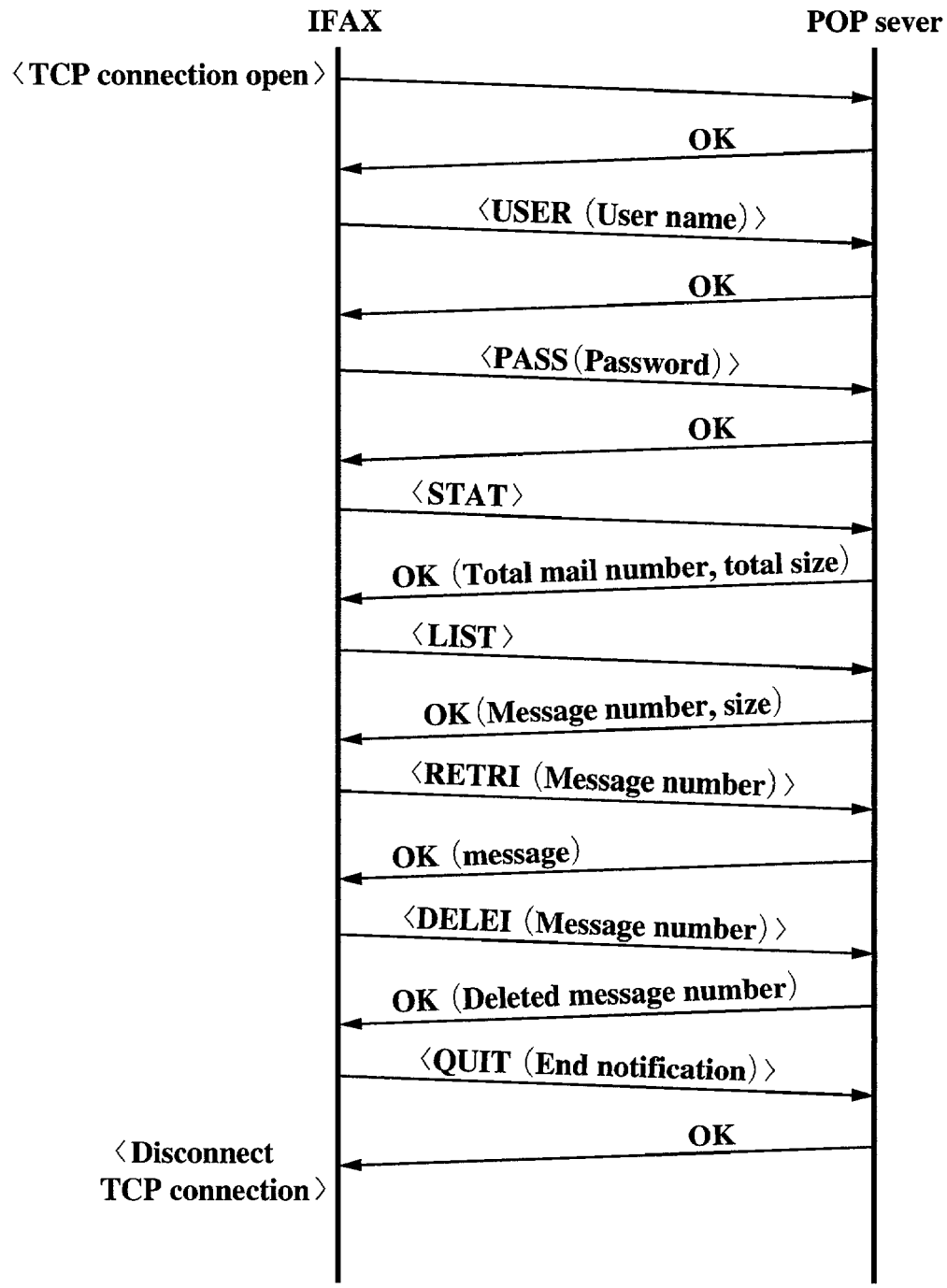
FIG. 4 is a sequence chart showing the communication steps in the POP3.

First, the basic communication steps of the POP are described by referring to FIG. 4. FIG. 4 is an example of POP3, however, the present invention is not limited to version 3.

POP3 operates in a client-server model. The internet facsimile apparatus of the present invention (hereafter referred to as IFAX) is a client and a mail server of a provider (hereafter referred to as POP server) is a server.

After the IFAX establishes a connection with the POP server requesting TCP connection to open, the IFAX informs the POP server of a user name by <USER>. After informing the user name, the IFAX notifies the POP server of the password sending <PASS> to the POP server. Here, < > shows a POP command.

After verifying the user name and the password, the IFAX inquires reception status of the mailbox by transmitting <STAT> to the POP server. The response from the POP server contains the total number of messages and the size of the total data received at the mailbox of the user.

Next, the IFAX inquires the current e-mail message list in the mailbox, by transmitting <LIST> to the POP server. The POP server then transmits a message number and the size of the received e-mail in response to <LIST>.

When the IFAX decides a message to receive from the response to <LIST>, it transmits the message number to the POP server attached to <RETR>. In order to receive the e-mail of message No. 1, <RETR1> is transmitted. The POP server then transmits the message data of message No. 1 in response to <RETR1>.

When the message data of message No. 1 is received normally, the IFAX transmits <DELE1> to the POP server for deleting the message of message No. 1 from the mailbox. The message deleted from the mailbox is notified to the IFAX as a response.

If there is no remaining message, the IFAX transmits <QUIT> to the POP server to notify the end of the mail reception operation and disconnects the TCP connection after receiving a response from the POP server.

The IFAX of the present embodiment is programmed so that the mail data reception section 21 is activated when the internet button 33 is pressed without setting a document at the document insertion slot 37. In other words, when the CPU 10 detects the establishment of AND condition that no document is set and the internet button 33 is pressed, the mail data reception section 21 is activated, and at the same time, the call section 20 calls the telephone number of the provider that is registered in advance. Here, a provider to connect can be selected from one or multiple providers. When the connection to the provider is established using the dial-up, the mail data reception section 21 executes the mail reception process using the POP described above.

Figure 5:
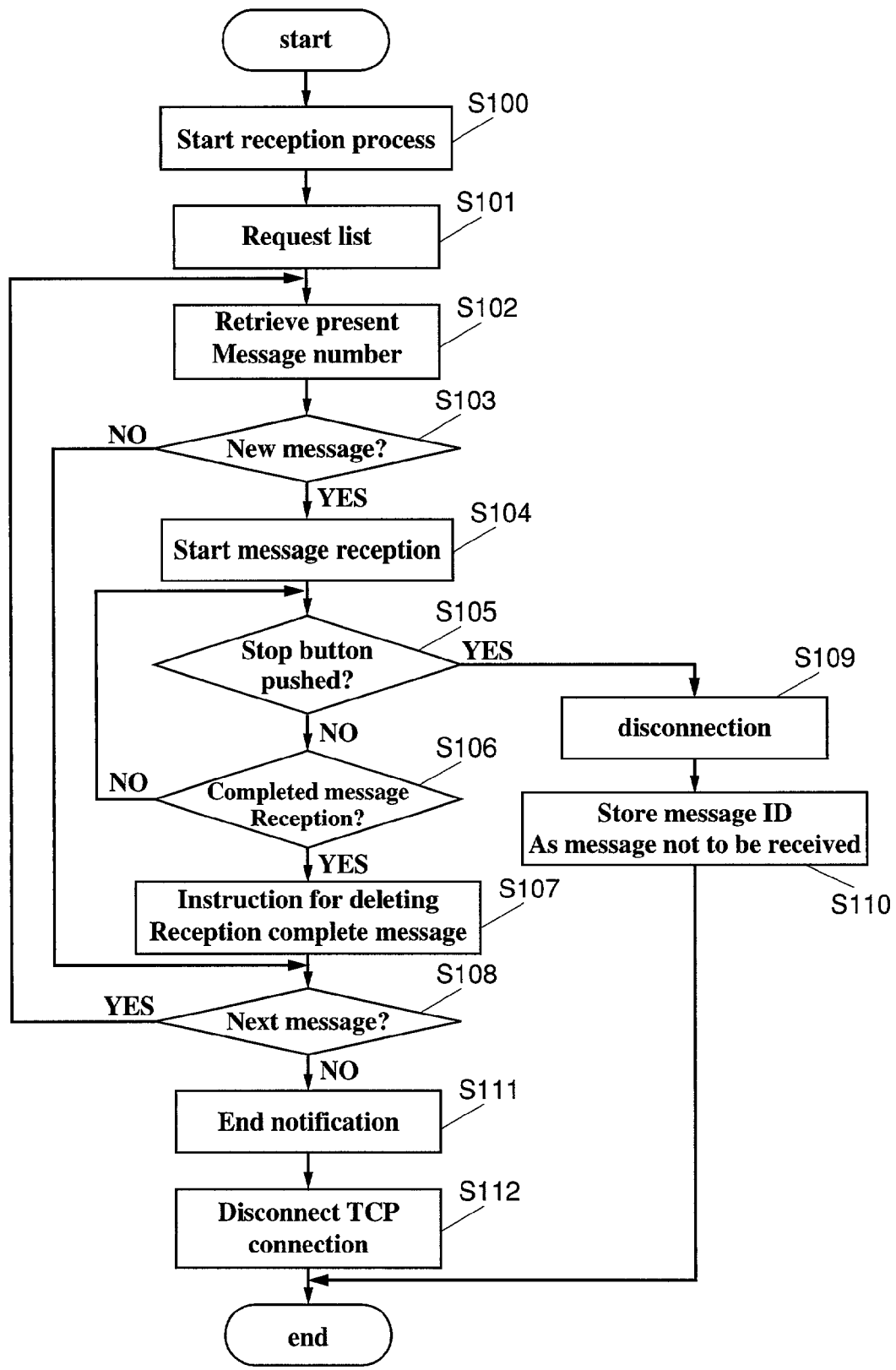
FIG. 5 is a flowchart of the reception process of the first embodiment.

Hereafter, a detailed mail reception process by the mail data reception section 21 is described by referring to FIG. 5.

When a reception process starts by a user's pressing the internet button 33 (S100), a message list of received mail that is stored in the mailbox is inquired by <LIST> (S101). From the received message list, the first message number is retrieved (S102), and whether it is of a newly received mail is checked (S103).

Here, there is a message that is not deleted since the reception process was not completed normally, by pressing the stop button 34 during the reception process in the past (hereafter referred to as non-receivable mail), and newly received messages that are received in the period between the previous access and the present access.

In the present embodiment, before starting the e-mail message reception by <RETR>, the present message number is checked whether it is of a non-receivable message or of a new message. For example, whether the message of the present message number is of a non-receivable mail or of a new message can be judged, from the number of the deleted messages by <DELE> from the previous access, the total number of the messages notified by the response of <STAT> from the present access, and the present message number. A detailed description is disclosed in the Japanese Patent Laid Open No. 11-328060.

The present invention is not limited to the judgment method mentioned above, as long as whether the message of the present message number is of a non-receivable mail or of a new message can be judged before starting the e-mail message reception by <RETR>. For example, if the message ID of a non-receivable mail is stored and the message ID can be obtained from the POP server by designating the message number using a special command before <RETR> is issued, it is possible to judge what is described above by comparing the message ID.

When the step S103 judges that there is a new message, the e-mail message reception of the message number is started by transmitting <RETR> that designates the message number (S104).

In order to stop the reception of the mail after starting the e-mail reception, the user presses the stop button 34. As a case of stopping an e-mail reception, for example, the reception is not completed after significant time has been spent since the reception process was started.

Whether the stop button 34 is pressed in the process of step S105 is always monitored, until the present message reception is completed. When the message reception is completed without pressing the stop button 34 (S106), the deletion of received mail is instructed by <DELE> (S107).

On the other hand, when the stop button 34 is pressed before the completion of the present message reception, step S109 is chosen and the connection is disconnected immediately. Some IFAX for professional use, even if a user instructs the disconnection, cannot disconnect until completion of the reception of the entire mail. However, the IFAX of the present invention forces the disconnection process section 22 to disconnect the line, when the stop button 34 is pressed during the reception process.

In case of a slow connection speed such as connecting to a provider via modem section 11, seek time usually becomes longer when the mail data is large and as a result, the telephone charge will increase. However, in the present embodiment, the line is disconnected immediately after the stop button is pressed. Therefore, it is possible to prevent unnecessary telephone charges.

When the line is disconnected at the step S109, the message ID of the interrupted e-mail is obtained from the received data and is stored at the predetermined address of RAM 16 (S10).

Unless the stop button 34 is pressed, the steps from S102 to S107 mentioned above are repeated until there is no other message (S108), and then the end notification is sent to the POP server by transmitting <QUIT> (S111). Then, the TCP connection is disconnected (S112).

Thus, the present embodiment makes it possible to prevent unnecessary telephone charges, since the line is disconnected immediately after the stop button 34 is pressed.

Second Embodiment

Next, preferred second embodiment of the present invention is described. The IFAX of the present embodiment has the same configuration as the first embodiment mentioned above, and only one part of the process for reception interruption is different, as described later. Here, the different part of the process is mainly described.

Figure 6:
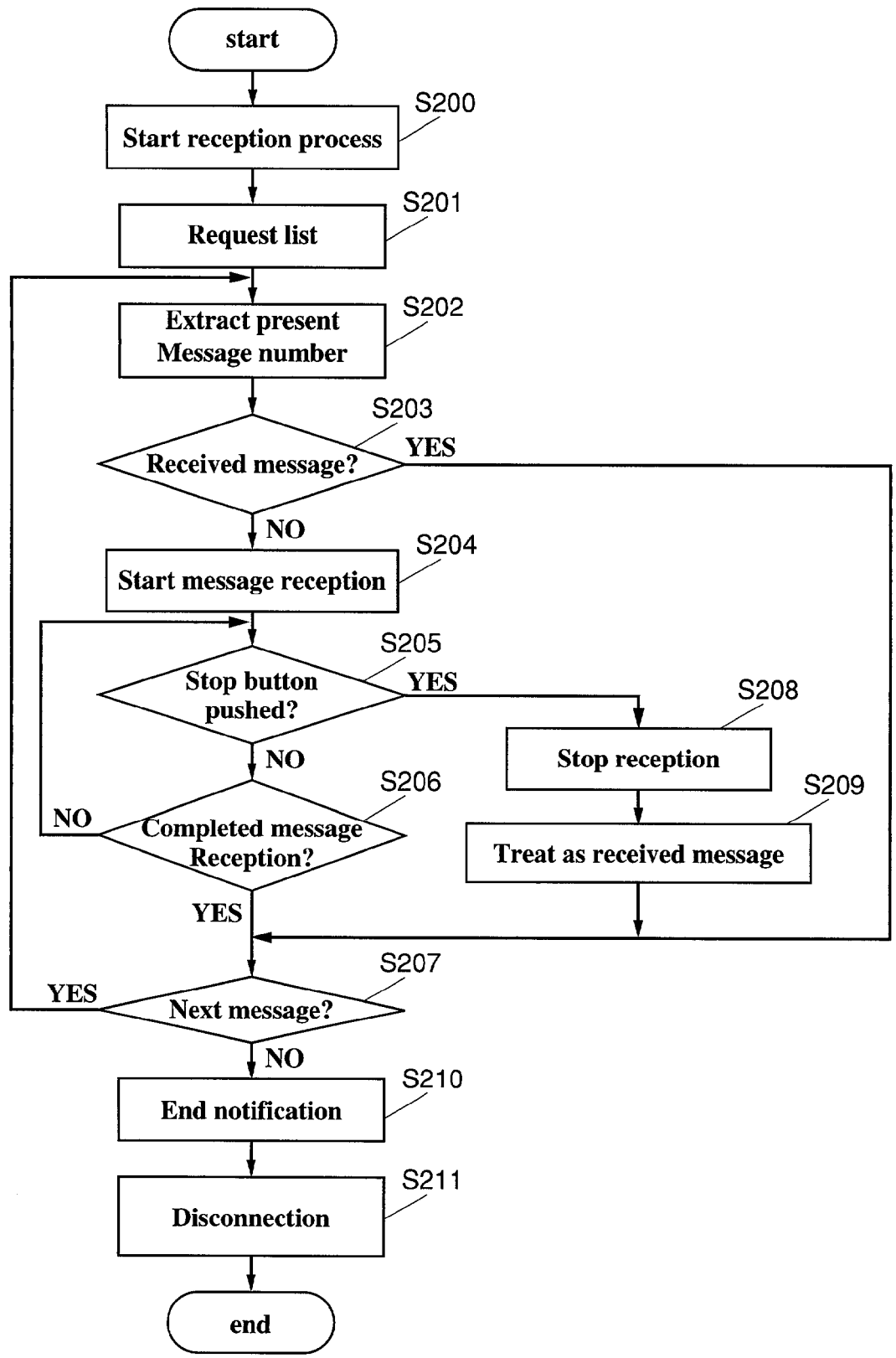
FIG. 6 is a flowchart of the reception process of the second embodiment.

FIG. 6 is a flowchart of the reception process of the IFAX of the second embodiment. When the reception process starts by the user's pressing the internet button 33 (S200), the message list of the received e-mail stored in the mailbox is inquired by <LIST> (S201). The first message number is extracted from the obtained message list (S202), and whether it is a received message is judged.

Here, an "already received message" is a message that a trial of receiving is once performed, either in the previous access or the present access. In the present embodiment, since the next message continues to be received without disconnecting even when the stop button 34 is pressed, it is not possible to judge, just by managing the number of the messages, whether the message is new and it is to be received for the first time. The step S203 judges whether the message is the one to be processed as an "already received message" at the present access (actually only partial message has been received since the reception is interrupted in the middle) and also whether it is a new message, in the same way as in the first embodiment above.

The step S203 judges whether the message is the one to be processed as an "already received message" at the present access (actually only partial message has been received since the reception is interrupted in the middle) and also whether it is a new message, in the same way as in the first embodiment mentioned above.

When a message is judged not as an "already received message" in the step S203, <RETR> is transmitted by designating the message number, and the e-mail message reception of the message number starts (S204).

Until the present message reception is completed, the step S205 always monitors whether the stop button 34 is pressed. When the message reception is completed without the stop button 34 being pressed (S206), whether there is next message is checked (S207). If there is a new message, the message number is incremented and the step S202 mentioned above is executed.

On the other hand, when the stop button 34 is pressed before the completion of the present message reception, the step S208 is chosen to process to stop the reception of the present message. The message number of the stopped message is stored in the predetermined address of RAM 16 and an "already received message" flag is set (S209).

Thus, it is possible to judge, by checking the "already received message" flag, whether the message with the present message number is once tried to be received but the reception was stopped.

Unless the stop button 34 is pressed, the steps from S202 to S207 are repeated until there is no other message. Then, the end notification is sent to the POP server by transmitting <QUIT> (S210), and the line is disconnected (S211).

Thus, the present embodiment makes it possible to stop the message reception with the connection maintained when the stop button 34 is pressed, and to continue the message reception if there is a next message. As a result, it is possible to achieve a smooth message reception by preventing a line disconnection when the user presses the stop button 34.

Third Embodiment

Next, the third embodiment of the present invention is described. The IFAX of the present embodiment has the same configuration as the first embodiment mentioned above, and only one part of the process for stopping the reception is different as described later. Therefore, the different part is mainly described here.

Figure 7:
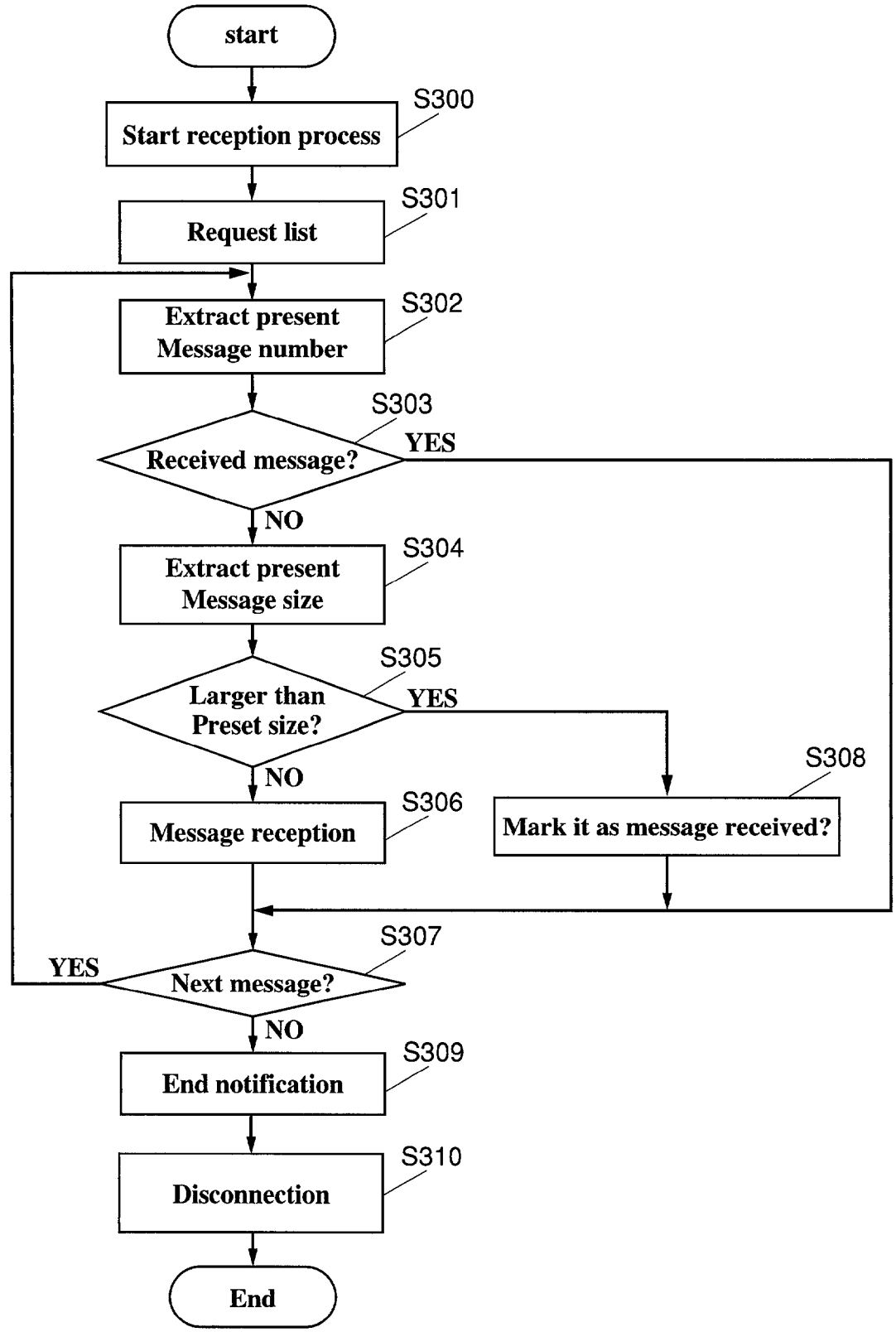
FIG. 7 is a flowchart of the reception process of the third embodiment.

FIG. 7 is a flowchart of a reception process of the IFAX of the third embodiment. When the reception process starts by the user's pressing the internet button 33 (S300), a message list of the received mails stored in the mailbox is inquired by <LIST> (S301). The first message number is extracted from the obtained message list (S302), and whether it is a received message is judged (S303). The step S303 judges whether it is a message processed as an "already received message" at the present access and also whether it is a new message in the same way as in the first embodiment.

When a message is judged not as an "already received message" in the step S303, the data size of the present message number is extracted in response to <LIST> (S304). If the data size of the present message number is smaller than a preset size (S305), <RETR> with the message number is transmitted and the e-mail message reception of the message number is executed (S306). When the message reception is completed, whether there is a next message is judged (S307). If there is a new message, the message number is then incremented and the step S302 mentioned above is executed.

On the other hand, when the data size of the present message number is larger than a preset size in the step S305 mentioned above, the step S308 is then executed ;the message number is stored in predetermined address of RAM and an "already received message" flag is set (S308).

Thus, it is possible to recognize that, by checking the "already received message" flag in the step S303, the present message number is of a message skipped at the present access because the size is larger than the preset size. Therefore, it is possible to prevent the message reception that causes a memory overflow.

After this, the steps from S302 to S308 are repeated until there is no other message. Then, the end notification is sent to the POP server by the transmission of <QUIT> and the TCP connection is disconnected (S310).

Thus, in the present embodiment, messages larger than a preset size are eliminated from the messages to be received. As a result, it is no longer necessary for a user to press the stop button 34 judging by the lapsed time of reception.

Fourth Embodiment

Figure 8:
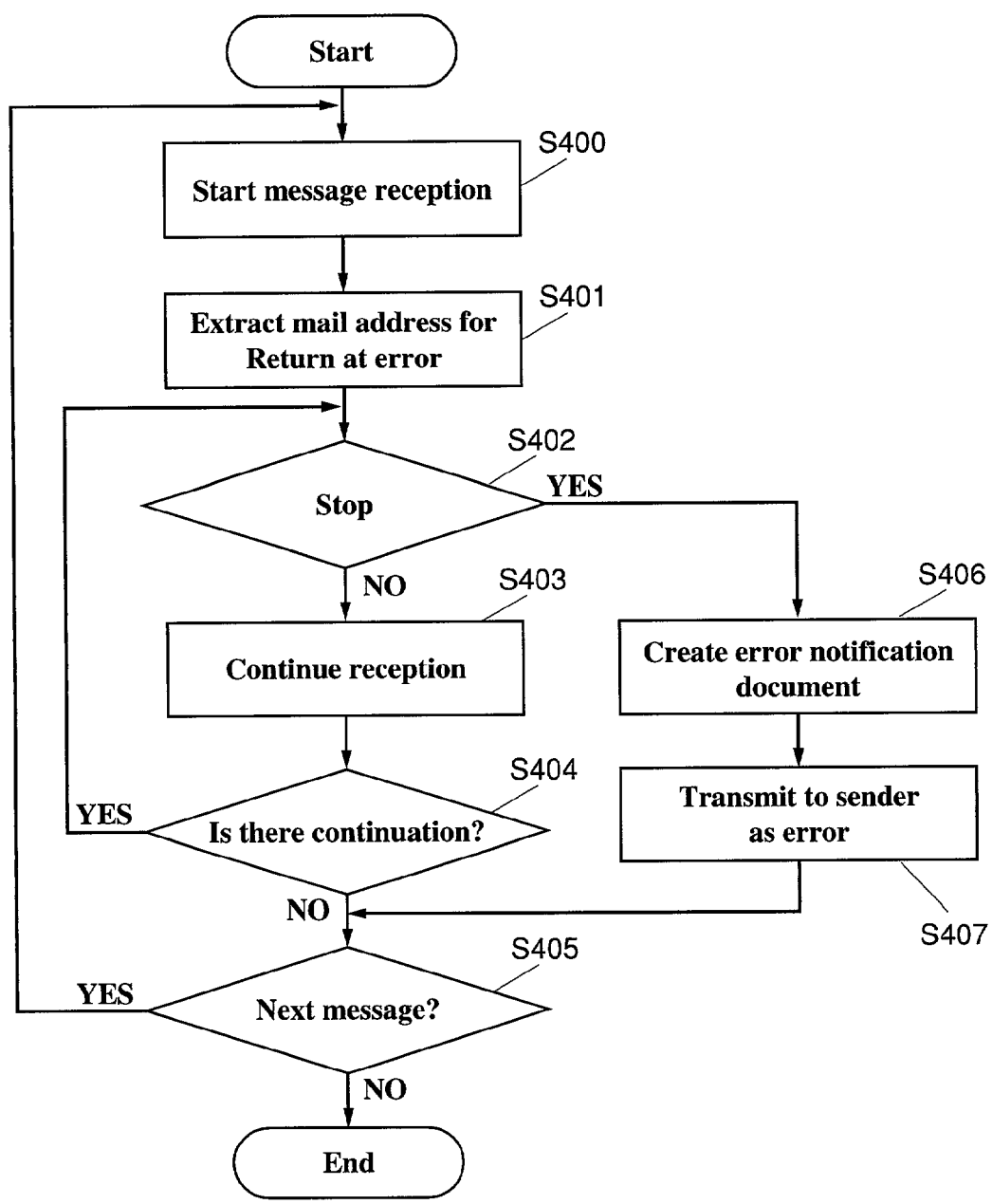
FIG. 8 is a flowchart of the reception process of the fourth embodiment.

Next, the fourth embodiment of the present invention is described. The IFAX of the present embodiment has the same configuration as the first embodiment above, and executes the same reception discontinuation process as in the first and second embodiments. Furthermore, it executes the process shown in FIG. 8 when the stop button is pressed.

When a message reception starts (S400), FROM address (address of a sender) is extracted from the mail header of the received message and stored in a predetermined address of RAM 16 for the return address for error (S401). Whether the stop button 34 is pressed during the reception is always monitored (S402, S403, S404). This process is repeated until there is no other message (S405). When the stop button is pressed while receiving a message, an error notification document for notifying the error to a sender is created (S406), and the mail address of the sender is selected from the stored addresses in step 401 to be used as a TO address (S407).

Thus, when a message is not received by the IFAX of the present embodiment, which is a receiver terminal, an e-mail notification is sent to a sender. As a result, the sender can recognize that the sent mail had an error to take an appropriate action on the sender side.

As described above, even when an e-mail of large size is received at the mail server of a provider, the present invention can provide a dial-up IFAX that prevents increasing telephone charges from repeated reception operations of the e-mail.

The present invention is not limited to the above described embodiments, and many variations and modifications may be possible without departing from the scope of the present invention.

This application is based on the Japanese Patent Application No. 2000 filed 402565 on Dec. 28, 2000, entire content of which is expressly incorporated by reference herein.

What is claimed is:

1. A dial-up Internet facsimile apparatus, comprising:
   a modem that makes a dial-up connection to a service provider of e-mail via a telephone line;
   an operation section that includes at least a start button and a stop button, the stop button being configured for disconnecting the connection to the service provider; and
   an e-mail receiver that receives e-mail data from the connected service provider and that, when the stop button is operated while receiving the e-mail data, disconnects the connection to the service provider without waiting for the completion of the e-mail data reception, and requires operation of the start button to perform another communication,
   wherein the e-mail receiver, upon disconnection of the connection to the service provider, stores data indicating that the e-mail data has been incompletely received,
   wherein, prior to receiving e-mail data, the e-mail receiver determines whether the e-mail data represents new data or represents previously incompletely received data,
   wherein when the e-mail receiver determines that the e-mail data represents previously incompletely received data, the e-mail receiver does not receive the e-mail data and determines whether another e-mail is to be received.

2. The dial-up Internet facsimile apparatus according to claim 1, wherein said e-mail receiver receives the e-mail data by a message unit.

3. The dial-up Internet facsimile apparatus according to claim 1, wherein said e-mail receiver, when receiving the e-mail data from the service provider, detects whether the e-mail data is the same e-mail data that was disconnected without waiting for the completion of the e-mail data reception while being previously received.

4. The dial-up Internet facsimile apparatus according to claim 1, further comprising:
   an error notifier that transmits an error notification mail to the sender of the e-mail data when the e-mail reception is interrupted.

5. The dial-up Internet facsimile apparatus according to claim 1, wherein the receiver disconnects the connection without regard to progress of the e-mail data reception.

6. A dial-up Internet facsimile apparatus, comprising:
   a modem that makes a dial-up connection to a service provider of e-mail via a telephone line;
   an operation section that includes a stop button, the stop button being configured for interrupting the reception of e-mail data from the service provider; and
   an e-mail receiver that receives e-mail data from the connected service provider and that, when the stop button is operated while receiving the e-mail data, interrupts the reception of the e-mail data from the service provider without waiting for the completion of the e-mail data reception, said receiver proceeding to the reception of the next e-mail data from the service provider after the interruption in reception of the e-mail data without an intervening data reception communication,
   wherein, when the e-mail receiver interrupts reception of the e-mail data, the e-mail receiver identifies the e-mail data as e-mail data that has been received.

7. The dial-up Internet facsimile apparatus according to claim 6,
   wherein said e-mail receiver sets a flag when the e-mail reception is interrupted.

8. A dial-up Internet facsimile apparatus configured to receive an e-mail from a service provider, the e-mail comprising a header and a body, the Internet facsimile apparatus comprising:
   a modem that makes a dial-up connection to the service provider of e-mail via a telephone line;
   an e-mail receiver that receives data regarding a size of the e-mail from the service provider before receiving the e-mail, skips reception of the e-mail with the received size data when the received size data of the e-mail exceeds a predetermined value, and proceeds to reception of a next e-mail without receiving either the header or the body of the e-mail with the received size,
   wherein the e-mail receiver receives the next e-mail without receiving the skipped e-mail, when the size data of the next e-mail does not exceed the predetermined value,
   wherein the e-mail receiver determines whether an e-mail has been previously received, and when an e-mail is determined to have been previously received, the e-mail receiver proceeds to reception of the next e-mail without determining the size of the previously received e-mail.

9. A method for receiving e-mail data, comprising:
   making a dial-up connection to a service provider of e-mail via a telephone line;
   receiving e-mail data from the connected service provider;
   disconnecting, when a stop button is operated while receiving the e-mail data, the connection to the service provider without waiting for the completion of the e-mail data reception, and requiring operation of a start button to perform another communication;

storing data indicating that the e-mail data has been incompletely received, upon disconnection of the connection to the service provider;

determining whether the e-mail data represents new data or represents previously incompletely received data, prior to receiving e-mail data; and determining whether another e-mail is to be received without receiving the e-mail data, when it is determined that the e-mail data represents previously incompletely received data.

10. The method of the receiving e-mail data according to claim 9, wherein the disconnecting being without regard to progress of the e-mail data reception.

11. The method for receiving e-mail data according to claim 9, further comprising determining, prior to receiving e-mail data, whether the e-mail data represents new data or represents previously incompletely received data.

12. The method for receiving e-mail data according to claim 11, wherein, when the e-mail data is determined to represent previously incompletely received data, the e-mail data is not received and it is determined whether other e-mail data is to be received.

13. The method for receiving e-mail data according to claim 9, further comprising detecting, when receiving the e-mail data, whether the e-mail data is the same e-mail that was disconnected without waiting for completion of the e-mail data reception while being previously received.

14. The method for receiving e-mail data according to claim 9, further comprising transmitting an error notification mail to a sender of the e-mail data when the connection is disconnected.

15. A method for receiving e-mail data, comprising:

making a dial-up connection to a service provider of e-mail via a telephone line;

receiving e-mail data from the connected service provider;

interrupting, when a stop button is operated while receiving the e-mail data, the reception of the e-mail data from the service provider without waiting for the completion of the e-mail data reception;

proceeding to the reception of the next e-mail data from the service provider after the interruption in reception of the e-mail data without an intervening data reception communication; and identifying the e-mail data as e-mail data that has been received, when the e-mail receiver interrupts reception of the e-mail data.

16. A method for receiving an e-mail, the e-mail comprising a header and a body, the method comprising:

making a dial-up connection to a service provider of e-mail via a telephone line;

receiving data regarding a size of the e-mail from the service provider before receiving the e-mail;

skipping reception of the e-mail with the received size data when the received size data of the e-mail exceeds a predetermined value;

proceeding to reception of a next e-mail without receiving either the header or the body of the e-mail with the received size;

receiving the next e-mail without receiving the skipped e-mail, when the size data of the next e-mail does not exceed the predetermined value;

determining whether an e-mail has been previously received; and proceeding to reception of the next e-mail without determining the size of the previously received e-mail, when it is determined that an e-mail has been previously received.

* * * * *